United States Patent [19]

Flowers

[11] 3,850,686

[45] Nov. 26, 1974

[54] PASSIVATING METHOD

[75] Inventor: Dervin L. Flowers, Scottsdale, Ariz.

[73] Assignee: Teledyne Semiconductor, a division of Teledyne, Inc., Mountain View, Calif.

[22] Filed: Nov. 6, 1972

[21] Appl. No.: 304,187

Related U.S. Application Data

[63] Continuation-in-part of Ser. No. 120,020, March 1, 1971, Pat. No. 3,770,498.

[52] U.S. Cl. ................. 117/201, 117/211, 117/219, 117/221, 117/223, 117/224, 317/235 AG

[51] Int. Cl. ............................ B44d 1/18, B44d 1/14

[58] Field of Search ........... 117/201, 215, 221, 223, 117/224, 219, 211; 148/187; 106/287 R, 288 R; 423/304, 277; 317/235 AG

[56] References Cited

UNITED STATES PATENTS

| | | | |
|---|---|---|---|
| 3,476,619 | 11/1969 | Tolliver | 148/187 |
| 3,476,620 | 11/1969 | Crisal | 148/187 |
| 3,507,709 | 4/1970 | Bower | 148/187 |
| 3,637,425 | 1/1972 | McMillan | 117/201 |
| 3,669,693 | 6/1972 | Dalton | 117/201 |
| 3,701,696 | 10/1972 | Mets | 117/201 |

*Primary Examiner*—Leon D. Rosdol
*Assistant Examiner*—M. F. Esposito
*Attorney, Agent, or Firm*—Nilsson, Robbins, Bissell, Dalgarn & Berliner

[57] ABSTRACT

A formulation and method for conditioning, gettering and sealing unglassed semiconductor devices. Fine particles of glass powder are dispersed in a conditioning and gettering solution of certain synergistic oxides. The formulation is applied and dried to condition, getter, seal and otherwise passivate the device surface.

10 Claims, 2 Drawing Figures

PASSIVATING METHOD

CROSS REFERENCE TO RELATED APPLICATION

This application is a continuation-in-part of application Ser. No. 120,020, filed Mar. 1, 1971, entitled PASSIVATING SOLUTION AND METHOD now U.S. Pat. No. 3,770,498.

FIELD OF THE INVENTION

The fields of art to which the invention pertains include the fields of semiconductor devices, for example, planar and epi planar diffused, mesa, and alloy types.

BACKGROUND AND SUMMARY OF THE INVENTION

Semiconductor diodes and transistors for use in various signal applications are made to exacting specifications to assure desired electrical characteristics and to provide precise performance. To retain those characteristics, it is necessary to protect the surface of the exposed junctions from conditions which would impair their characteristics or which would otherwise damage or destroy the devices. Surface contaminants, moisture, harmful vapors and changes in surface states are detrimental to the proper operation of semiconductor devices. This detriment behavior is manifest as "soft" or degraded breakdown voltages which are due to the high fields existing at the surface and premature conduction or breakdown under reverse bias due to the lack of dielectric strength of the surface contaminant or surrounding ambient which may adsorb on the surface. Most frequently, the deleterious contamination is due to sodium or other alkali metals, e.g., K or Li which under forward bias and on a PN junction migrate to the interface of the oxide-semiconductor device, pile up at the semiconductor junction, and, not being able to sustain the high fields associated with junction peripheries, conduct prematurely. These detriments are particularly manifested in double plug packages, known in the semiconductor industry as DO-34 and DO-35 packages and in planar CD-1 devices. Prior techniques for passivating such devices have included sedimentation of glass powder, sputtering and silicon nitride growth as well as the use of resins, varnishes, silicones, and the like. While these treatments are helpful, imperfections in glassing or trace contaminants often cause a high rejection rate during normal production of the devices. For example, when tested for targeted breakdown voltage and for reverse current after high temperature reverse polarization, yields of acceptable devices lower than 15 percent are often encountered. In terms of finished devices, such low yields represent an immense monetary loss.

Many prior attempts have been made to upgrade these devices by various passivating techniques. By passivate, a process is meant which does any or all of the following: (1) seals the treated surfaces and exposed interfaces; (2) getters, i.e., (a) immobilizes alkali and other contaminants and/or (b) permits survival, e.g., package sealing in high sodium, or other alkali, ambients; (3) renders the treated surface inert; and (4) prevents ion migration to the junction. For example, in U.S. Pat. No. 3,345,275, Schmidt et al. describe passivation by anodizing silicon using a solution of pyrophosphoric acid in tetrahydrofuryl alcohol as electrolyte. In U.S. Pat. No. 3,481,029, Wittke describes passivation by treating a metal oxide surface with a water-$Mn(NO_3)_2$-$SiO_2$ sol. In U.S. Pat. No. 3,309,245, Haenichen discloses that semiconductor devices can be passivated by selectively diffusing phosphorus impurities into p-type silicon, exemplified by phosphorus supplied from a layer of borosilicate glass. In U.S. Pat. No. 3,297,500, Drake et al. disclose that a metal oxide semiconductor device can be passivated by heating the unanodized device at 1,200°C in an atmosphere containing oxygen and water vapor in the presence of vanadium pentoxide to deposit vanadium pentoxide simultaneously with silica film formation. In U.S. Pat. No. 3,476,619, Tolliver discloses passivation of a metal oxide semiconductor device by applying a layer of silicon dioxide containing a phosphorus compound and heating at 350°–900°C. In U.S. Pat. No. 3,476,620, Crishal et al. disclose passivation by codepositing $SiO_2$ and $B_2O_3$ by simultaneous decomposition of ethyl silicate and n-propyl borate at 675°–700°C under reduced pressure, and further describe phosphorus and vanadium as other glass formers. Other prior disclosures of interest are Hoogendoorn et al. U.S. Pat. No. 3,303,399, Klein U.S. Pat. No. 3,456,169, Lehrer U.S. Pat. No. 3,475,210, Reinertz U.S. Pat. No. 3,180,755, Moles U.S. Pat. No. 3,287,188, Tombs U.S. Pat. No. 3,422,321, Kerr U.S. Pat. No. 3,457,125 and Nishida et al. U.S. Pat. No. 3,507,716.

In my prior application Ser. No. 120,020, referred to above, I disclose conditioning and gettering solutions which provide a simple, facile and economical method for passivating metal oxide semiconductor devices and for upgrading rejected glassivated devices to an acceptable yield. The solutions comprise a passivating amount of at least one oxide of an element selected from Groups IIA, IIB, IIIA, IIIB, IVA, VA, VB, VIA and VIB of the Periodic Table. Particularly good results are obtained when the foregoing oxide is synergistically combined, in solution, with one or more additional oxides such as boron oxide or a combination of boron oxide and vanadium oxide. Such solutions can suitably passivate semiconductor devices for sealing in a double plug package of the type known in the industry as a DO-34 or DO-35 package, without the usual necessity to glass or nitride passivate the surface. In this way, one can passivate, for example, a very highly gold doped device and keep the gold in the crystal. Ultra high speed diodes may thus be fabricated for double plug packaging without the need for the usual high temperatures glassing or nitride techniques which severely degrade the short lifetime characteristics of gold doped, high speed diodes.

While the foregoing solutions of my prior application are generally applicable to virgin dice (i.e., unglassed) and to glassed dice, it has now been found that certain virgin dice are so resistant to passivation that further improvement is desirable. In particular, certain semiconductor devices which are not gold doped, such as the devices known in the industry as planar CD-1 devices, are very difficult to passivate in their virgin state. These devices have a 10 microamp breakdown voltage, of about 15 –400 volts. When treated with passivating solutions of my prior application some passivation is obtained but only up to about 10 percent yield.

The present invention provides an improvement in the formulation of my prior solutions wherein unglassed non-gold-doped devices, such as referred to above, can be passivated to a 70–90 percent yield. The formulation can be used for DO-34 and DO-35 packages, or for preparing any type of package from unglassed dice. While the present invention is best displayed statistically by dice with the full surface unglassed, the same invention applies to full and less than full area glassed surface exposure. Such may be from damage or failures to apply glass fully wherein exposed minute unglassed surface benefits by the present invention.

In accordance with the present invention, passivating solutions as referred to in my prior application are improved by dispersing in the solution fine particles of glass. The formulation is applied to an unglassed or glassed device, evaporated to dryness and the device is heated at 300°–1,000°C for a few minutes. Following brief lapping to remove adhering glass particles from the ohmic metal contact, and treatment with ammonia to remove excess oxide, the device is dried and can then be packaged in accordance with any prior method to provide a usable device.

In particular, the passivating solution to which the glass particles are added contains an oxide of an element chosen from Groups IIA, IIB, IIIA, IIIB, IVA, VA, VB, VIA and VIB. The solution preferably contains an oxide of a Group VA element exemplified by the oxides of phosphorus, arsenic, antimony and bismuth. In particular, it has been found that a combination of oxides yields a synergistic effect in that overall performance of the passivating solution is better than the performance obtained when using a solution or dispersion of individual oxides. Phosphorus pentoxide is hygroscopic and when used, it is particularly advantageous to add other, non-hygroscopic oxides. For example, boron trioxide (boron anhydride) can be added to the phosphorus pentoxide. Boron trioxide is normally insoluble in the solvent constituting the solution, but dissolves in the presence of the phosphorus pentoxide and imparts non-hygroscopic properties to the formulation. Still another oxide, such as vanadium pentoxide, is incorporated to further improve the efficiency and results of the treatment and the formulation can be further improved by the addition of an alkaline earth metal oxide, e.g., Group IIA oxide, exemplified by strontium, calcium or barium.

DETAILED DESCRIPTION

Figure 1:
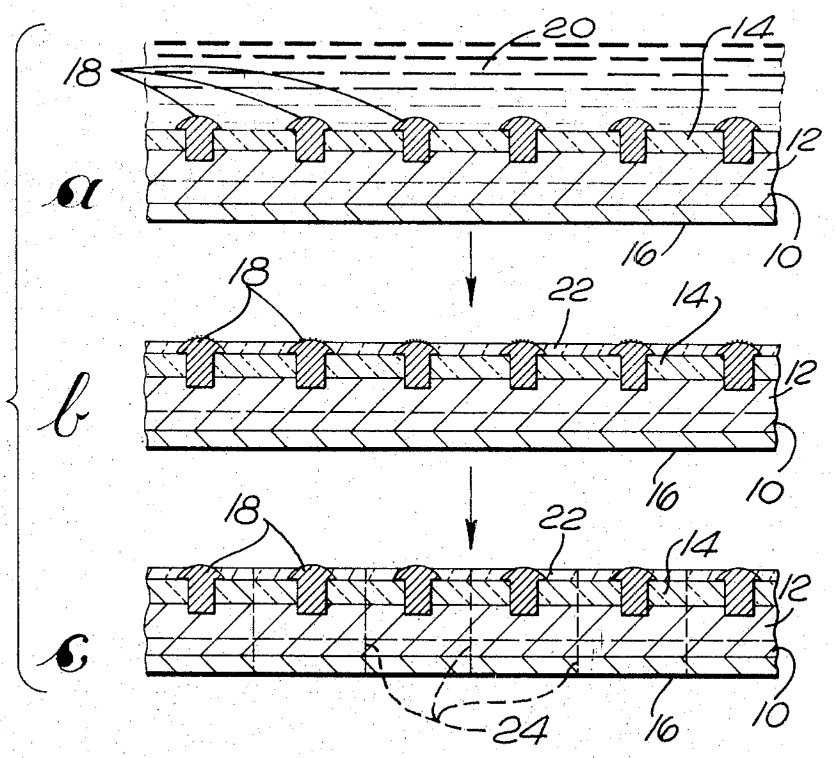
FIGS. 1*a*–1*c* are cross-sectional, diagrammatic views of a wafer containing a plurality of semiconductor devices during various stages of treatment in accordance herewith.

Referring to FIG. 1, a method of operation is illustrated in which a plurality of unglassed semiconductor devices are passivated utilizing a formulation which will be described in more detail below. The passivation treatment seals the devices and replaces a glassing step. In this embodiment the devices are passivated prior to dicing, that is, solution is applied to the wafer prior to scribing and breaking into dice, but may also be applied after dicing. A wafer 10 of N+ conductivity type is formed with an expitaxial layer 12 of N type on which is formed a silicon dioxide film 14. The wafer is photochemically masked and etched to provide a plurality of windows through which P conductivity type impurity is diffused into the epitaxial layer 14 to form PN junctions (too shallow to be illustrated). Further silicon dioxide film is formed to overlap the PN junctions, windows are formed therethrough and palladium and silver are successively deposited on the exposed surfaces of the wafer to form a lower silver contact layer 16 and a plurality of silver contact buttons 18, one button for each device to be subsequently formed by dicing. Typically, a wafer 1.5 inches in diameter will yield about 2,300 devices.

Figure 2:
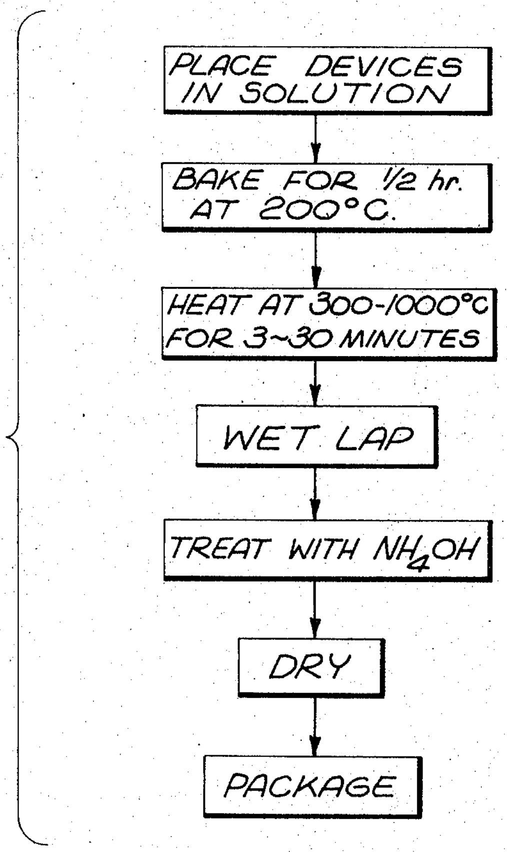
FIG. 2 is a block diagram illustrating various steps of treatment in accordance with the present invention.

In prior art methods of fabrication, at this stage a glass film or layer would be applied to exposed silicon dioxide surfaces, e.g., by sedimentation techniques, followed by a firing process to fuse the glass particles and intimately bond the glass to the underlying silicon dioxide layers. However, in accordance with the present invention, as illustrated in FIG. 1*a*, the wafer is soaked in ammonium hydroxide, as a cleaning step, and then placed in a passivating formulation 20, as will be described below. Referring additionally to FIG. 2, excess solvent is allowed to evaporate by baking the wafer for about one-half hour at about 200°C following which the wafer is heated to a temperature of about 300°–1,000°C, preferably 400°–800°C for a few minutes, generally about 3–30 minutes to form an overcoating of passivating oxides 22 (FIG. 1*b*). The wafer is then lapped briefly with 600 A wet lapping paper to remove adhering glass particles on the silver contact buttons 18. The device is then treated with ammonium hydroxide which assures removal of deposited oxide passivating agents from the surface of the silver buttons 18, but leaves the oxides deposited on the silver dioxide surfaces, as shown in FIG. 1*c*, where they are tenaciously retained. The wafer is then scribed, as indicated by the dashed lines 24 to dice the wafer and provide the devices as independent components. Each device is then sealed in a suitable package, e.g., DO-34 or DO-35, in accordance with prior art techniques to provide an electronic component which is gettered, conditioned and sealed for more reliable performance then heretofore available. on a comparable cost basis. It should be noted that the process steps set forth above are somewhat optimized and that variations including the omissions of many steps can be practiced with good results. The invention in its basic form consists simply of applying the passivating formulation to the semiconductor device followed by heating.

Of paramount importance to the success of the foregoing processes is the nature of the passivating formulation 20. The solution is formulated of a solvent which is constituted to wet the silicon, metal and oxide surfaces of the devices and which contains passivating oxide dissolved in the solvent. Oxide passivating agents which are usable are those which perform a gettering, conditioning or sealing function, either alone or in combination with other oxides. In particular, the oxides can be normally solid oxides of elements chosen form Group IIA, IIB, IIIA, IIIB, IVA, VA, VB, VIA and VIB, and mixtures thereof. Thus, one can utilize one or more of the oxides of calcium, strontium barium and the like; zinc, cadmium and the like; boron, aluminum, gallium, indium, thallium, scandium, yttrium, lanthanum, and the like; actinium and the like; silicon, germanium, tin, lead; phosphorus, arsenic, antimony, bismuth; vanadium, columbium (niobium), tantalum; selenium, tellurium, polonium; chromium, molybdenum and tungsten.

While many of the foregoing elements contain several oxide forms, all of such forms are generally useful, the higher valence oxide forms being preferred.

In accordance herewith, fine glass particles are dispersed in the solvent to obtain the formulation 20. The glass particles are 20 microns in diameter or smaller, within the range of 500 A — 20 microns. Generally about 0.1–50 grams of glass particles are added per liter of solution, a range of about 0.5 – 10 grams per liter being preferred. Any glass particles which are useful in glassing semiconductor devices can be used and various compositions are well known to the art. Since sodium will be gettered by the action of the oxide components, even those glasses containing some sodium can be used. Thus, one can use glass containing from minor to major amounts of silicon, high lead glass, e.g., containing more than 20 percent lead on analysis, and high zinc glass, e.g., containing more than 20 percent zinc on analysis.

In accordance with more specific aspects of the formulation, a plurality of passivating oxides can be utilized to obtain synergistic passivation in that by using a combination of certain types of such oxides an overall result is achieved which is more desirable in sum than the results which are achieved by the individual components. Thus, it has been found that phosphorus pentoxide, provides excellent gettering action and excellent passivation, but as a result of its hygroscopic nature, devices so treated may suffer from some hydrolytic instability upon extended storage. On the other hand, oxides which are substantially non-hygroscopic are generally so insoluble in wetting solvents as to be impractical unless they are very finely dispersed and suspended. However, in accordance with this embodiment, when such an insoluble oxide is added to a solution of a Group VA oxide, sufficient interaction appears to take place between the components to solubilize a useful amount of the otherwise insoluble oxide. In particular such insoluble oxides include the normally solid oxides of Group IIIA elements, such as boron, and Group IIB and IVA elements such as germanium, silica and zinc. When the Group VA oxide is phosphorus pentoxide, the interaction with boron trioxide, for example, eliminates any hydroscopic effect.

It will be recognized that the nature of such interaction may be quite complex and it is not intended to rely on any particular theory of operation. With this in mind, it may be theorized that to the extent that the Group VA oxide is hydrolyzed to an acid, an odd pair of electrons on the hydroxy oxygen of such acid, having a large affinity for the hydrogen of water, attracts the water and chemically adsorbs it. For example, with phosphorus pentoxide, boron trioxide appears to interact as anhydride boric acid and eliminating its acid character. This interaction can explain the solubility of the boron trioxide in a solvent in which it is insoluble in the absence of the dissolved Group VA trioxide. The result is a binary mixture possessing excellent gettering, conditioning and sealing properties. The oxides of arsenic, antimony and bismuth can replace part or all of the phosphorus pentoxide. Germanium dioxide, silicon dioxide and zinc oxide can supplement or can replace part or all of the Group IIIA oxides. These latter oxides are not soluble in the presence of phosphorus pentoxide but can be dispersed therewith. It should be noted that the combination of oxides can be premixed so as to constitute a single oxide component. For example, oxides of phosphorus and of boron can be added separately or as a single material which can be called boron phosphate ($BPO_4$).

It has also been found that still another type of insoluble, non-hygroscopic oxide can be added following formulation of the above binary addition, to formulate a ternary or greater mixture of oxides having even further improved properties. Such "second added" oxide is not soluble in the solvent even in the presence of the Group VA oxide, but it has been found that a double synergism exists in that such second added oxide can be dissolved to a useful extent when both the Group VA and interacting non-hygroscopic oxide are present in the solution. For example, vanadium pentoxide has no useful solubility in isopropanol solution of phosphorus pentoxide, but it is soluble if boron trioxide is also present, and significantly contributes to the passivating properties of the formulation. In other words, phosphorus pentoxide is soluble in isopropyl alcohol which then allows boron trioxide to go into solution. The soluble boron trioxide-phosphorus pentoxide then allows vanadium pentoxide to go into solution. It should be noted that the vanadium pentoxide does not go rapidly into solution but when left standing for some time, for example 16 hours, sufficient amounts go into solution to substantially further improve the properties of the solution. Other such "second" oxides are other oxides of Group VB elements such as vanadium trioxide, columbium pentoxide and tantalum pentoxide; and Group VIB oxides such as tungsten dioxide and tungsten trioxide.

It has further been found that if 0.001 to 0.5 weight percent of the oxide of calcium, strontium or barium is added, an additional 5–30 percent improvement in the electrical yield may be obtained.

In general, any solvent can be utilized which can wet the surface of a semiconductor device and which does not deleteriously react with the passivating oxide or is deleteriously affected thereby. For example, one can use polar organic solvents such as methanol, ethanol, isopropanol, nitromethane, 1,4 dioxane, dimethyl sulfoxide, tetrahydrofuran or other ethers, water, aromatic solvents such as toluene, benzene, chlorobenzene, nitrobenzene, basic hydrocarbons such as ethylamine, triethylamine, pyridine, aniline, solvents such as carbon tetrachloride, chloroform, dimethylformamide, trichloroethylene and carbon disulfide and the like or mixtures thereof. When solvents with a carbonyl group, such as esters, aldehydes and ketones are used, a reaction can occur, resulting in the formation of deterioration products which can interfere with the passivating effect of the oxides. When water is utilized as a solvent, it should be mixed with a better wetting solvent and/or with a surfactant, such as Aerosol OT, trade name for dioctyl sodium sulfosuccinate. Any other commercial surfactant can be used. Generally it is desirable to utilize a solvent which can wet both the semiconductor metals, semiconductor oxide and silver. Isopropyl alcohol and the other alcohols are particularly suitable in this regard. Generally, the solution includes about 0.01 to about 10 weight percent of total dissolved or dispersed oxides. It is convenient to prepare a stock solution at about twice that concentration, which can be diluted for use, such stock solution appearing to be somewhat more stable than the diluted solution. In terms of relative concentration, where a mixture of oxides is used, from about 1 to about 10 parts of first added oxide can be utilized per part of Group VA oxide. In a ternary system, the amount of second added oxide is generally less, about 0.01 to about 1 part per part of Group VA oxide. Group IIA oxide can be added to the extent of about 0.01 to about 1 part per part of Group VA oxide.

The following examples, in which all parts are by weight, will illustrate the invention.

EXAMPLE 1–19

To form a particular solution 20 referred to in FIG. 1, 1.73 weight percent phosphorus pentoxide, 3.30 weight percent boron trioxide and 0.098 weight percent vanadium pentoxide are dissolved in absolute isopropanol to form a stock solution which is dissolved with an equal part of absolute isopropyl alcohol just prior to use. The phosphorus pentoxide is added first to the isopropanol and the solution is allowed to stand until the phosphorus pentoxide completely dissolves. Thereafter the boron trioxide is added with stirring until dissolved. Vanadium pentoxide is added after the boron trioxide. After the stock solution is prepared, 1 part is diluted with 4 parts of isopropanol to provide a passivating solution. To this solution 1 part of glass particles from the following TABLE I is added per 1,000 parts of solution. The particles have a diameter range of about 500 A – 20 microns.

TABLE I

| Component oxide of glass particles(1) | Example No. | | | | | |
|---|---|---|---|---|---|---|
| | 1 | 2 | 3 | 4 | 5 | 6 |
| silicon | — | major constituent | | | — | 19.0 |
| lead | 17.5 | 0.007 | 0.04 | 12.5 | 15 | 29.0 |
| aluminum | 8.0 | 7.0 | 2.0 | 12.5 | 3.5 | 12.0 |
| boron | 12.5 | 12.5 | 15 | 15 | 12.5 | 0.79 |
| titanium | 0.015 | 0.02 | 0.02 | 0.015 | 0.015 | 0.31 |
| magnesium | 0.005 | 0.015 | 0.03 | 0.005 | 0.003 | 0.0004 |
| iron | 0.03 | 0.03 | 0.04 | 0.03 | 0.02 | 0.032 |
| bismuth | 0.007 | — | — | 0.003 | 0.007 | 0.026 |
| copper | 0.007 | 0.004 | 0.015 | 0.006 | 0.01 | 0.0008 |
| silver | — | — | — | — | — | 0.0006 |
| calcium | 0.03 | 0.12 | 0.1 | 0.06 | 0.02 | 0.02 |
| barium | 0.001 | 3.0 | 0.3 | 7.5 | 0.002 | — |
| sodium | — | 2.5 | 0.7 | — | — | — |
| potassium | — | 2.5 | ≈0.5 | — | — | — |
| lithium | — | 1.25 | 0.65 | — | — | — |
| arsenic | 1.0 | — | — | 0.75 | 1.0 | — |
| zirconium | 0.015 | 0.04 | 0.2 | <0.01 | 0.01 | — |
| manganese | <0.001 | 0.004 | 0.001 | < 0.001 | <0.001 | — |
| gallium | 0.001 | 0.002 | <0.001 | 0.001 | <0.001 | — |
| strontium | — | 0.04 | 0.003 | 0.025 | — | — |
| tin | — | 0.05 | — | — | — | — |
| zinc | — | — | — | — | 0.1 | — |
| cadmium | — | — | — | — | — | — |
| antimony | — | — | — | — | — | — |
| other elements | — | — | — | — | — | — |

| particles(1) | 7 | 8 | 9 | 10 | 11 |
|---|---|---|---|---|---|
| silicon | 19.0 | 33.0 | 6.7 | 25.0 | 25.0 |
| lead | 42.0 | 24.0 | 13.0 | 37.0 | 34.0 |
| aluminum | 6.0 | 0.15 | 1.7 | 0.55 | 0.99 |
| boron | 0.82 | 1.1 | 8.8 | 1.4 | — |
| titanium | trace | — | — | trace | 0.24 |
| magnesium | 0.0004 | 0.0003 | 0.0011 | 0.0006 | 0.071 |
| iron | 0.025 | 0.031 | 0.015 | 0.028 | 0.042 |
| bismuth | 0.023 | 0.016 | — | 0.026 | 0.029 |
| copper | 0.0007 | 0.001 | 0.0022 | 0.0006 | 0.00065 |
| silver | 0.00075 | trace | — | 0.0006 | 0.0008 |
| calcium | 0.0099 | 0.0018 | 0.0035 | 0.001 | 0.44 |
| barium | — | — | — | — | — |
| sodium | — | — | — | — | 0.26 |
| potassium | — | — | — | — | 5.5 |
| lithium | — | — | — | — | — |
| arsenic | — | — | — | — | — |
| zirconium | — | — | — | — | — |
| manganese | — | — | — | — | — |
| gallium | — | — | — | — | — |
| strontium | — | — | — | — | 0.0035 |
| tin | — | — | — | — | — |
| zinc | — | — | 32.0 | — | — |
| cadmium | — | — | trace | — | — |
| antimony | — | — | — | — | — |
| other elements | — | — | — | — | — |

| particles(1) | 12 | 13 | 14 | 15 | 16 | 17 |
|---|---|---|---|---|---|---|
| silicon | 23.0 | 19.0 | 19.0 | 24–25 | 7.0 | 33.0 |
| lead | 38.0 | 29.0 | 42.0 | 29–37 | 7–13 | 24 |
| aluminum | 0.018 | 12.0 | 6.0 | 1–8 | 1–2 | — |
| boron | — | 1.0 | 1.0 | 1.0 | 9–14 | 1.0 |
| titanium | 0.0085 | — | — | — | — | — |
| magnesium | 0.0016 | — | — | — | — | — |
| iron | 0.026 | — | — | — | — | — |
| bismuth | trace | — | — | — | — | — |
| copper | 0.0007 | — | — | — | — | — |
| silver | 0.0006 | — | — | — | — | — |
| calcium | 0.0016 | — | — | — | — | — |
| barium | — | — | — | — | — | — |

TABLE I – Continued

| Component oxide of glass particles[1] | Example No. 12 | 13 | 14 | 15 | 16 | 17 |
|---|---|---|---|---|---|---|
| sodium | — | — | — | — | — | — |
| potassium | 6.7 | — | — | — | — | — |
| lithium | — | — | — | — | — | — |
| arsenic | — | — | — | — | — | — |
| zirconium | — | — | — | — | — | — |
| manganese | — | — | — | — | — | — |
| gallium | — | — | — | — | — | — |
| strontium | — | — | — | — | — | — |
| tin | — | — | — | — | — | — |
| zinc | — | — | — | — | 22–32 | — |
| cadmium | — | — | — | — | — | — |
| antimony | 0.37 | — | — | — | — | — |
| other elements | — | — | — | — | — | — |

| particles[1] | 18 | 19 |
|---|---|---|
| silicon | 31–32 | 24–25 |
| lead | 28–30 | 13–17 |
| aluminum | — | 10–13 |
| boron | — | 1–15 |
| titanium | — | — |
| magnesium | — | — |
| iron | — | — |
| bismuth | — | — |
| copper | — | — |
| silver | — | — |
| calcium | — | — |
| barium | — | 4–8 |
| sodium | — | — |
| potassium | — | — |
| lithium | — | — |
| arsenic | — | 0–1 |
| zirconium | — | — |
| manganese | — | — |
| gallium | — | — |
| strontium | — | — |
| tin | — | — |
| zinc | — | — |
| cadmium | — | — |
| antimony | — | — |
| other elements | — | — |

[1] percentages are those of the elements, as analyzed.

Thereafter non-gold-doped planar CD-1 devices are treated with the solution without the glass particles and with the glass particles listed, following the procedure described with respect to FIGS. 1 and 2. The treated dice are then sealed in a package immediately and tested to determine the percentage of dice having a targeted breakdown voltage ($E_S$) yield, forward current ($I_F$) yield and reserve current ($I_B$) yield. $E_S$ yields are obtained by determining the percentage of dice conducting less than 10 microamps at a reverse voltage of −50 volts. $I_F$ is obtained by determining the percentage of dice having a stable conduction of greater than 300 milliamps in a forward direction at one volt. $I_B$ is obtained by determining the percentage of dice conducting less than 50 nanoamps after reverse polarization for 16 hours at −50 volts, at room temperature. Overall yield is determined by simply multiplying the individual yields. When the passivating solution is used without glass particles yields of about 10 percent are obtained. When glass particles from TABLE I are added to the passivating solution to provide a formulation of this invention, yields of about 70–90 percent are typically obtained.

EXAMPLES 20–21

A solution can be prepared as in Examples 1–19 but one can also add 0.75 percent silicon dioxide powder or germanium dioxide powder to provide a passivating solution imparting increased electrical yield.

EXAMPLE 22

A solution can be prepared as in Examples 1–19 but in addition containing 1 percent zinc oxide powder to provide an enhanced passivating solution useful in accordance with the methods herein.

EXAMPLE 23

A solution can be prepared as in Examples 1–19 but in addition containing 0.2 percent barium oxide powder to provide an improved passivating solution.

EXAMPLE 24

A solution can be prepared as in Examples 1–19 but in addition containing 0.1 percent calcium oxide powder to provide an improved passivating solution which can be used to significantly increase electrical yield.

EXAMPLE 25

A solution can be prepared as in Examples 1–19 but in addition containing 0.5 percent strontium oxide powder to enhance the passivating affect on the solution.

As required, detailed illustrative embodiments of the invention have been disclosed. However, it is to be understood that these embodiments merely exemplify the invention which may take many forms substantially different from the specific illustrative embodiments disclosed. Therefore, specific details are not to be interpreted as limiting, but merely as a basis for the claims. In particular, while the examples illustrate specific use on unglassed devices, the solution can be applied to glassed devices in accordance with the foregoing procedure. In this regard reference may be had to application Ser. No. 120,020, referred to above, and the present formulation and application technique applied to the glassed devices there disclosed.

I claim:

1. In a method for passivating a semiconductor device which includes the steps of applying to a surface thereof to be passivated a formulation of a passivating amount of at least one oxide of an element selected from Groups IIA, IIB, IIIA, IIIB, IVA, VA, VB, VIA and VIB of the Periodic Table, in a solvent for dissolving said oxide, said solvent being substantially free of carbonyl groups and constituted to wet said surface, and heating said surface with said applied oxide thereon, the improvement according to which there is added to said formulation about 0.1–50 parts of glass particles per 1000 parts of said formulation, said glass particles having a diameter range of about 500 Å - 20 microns.

2. The improvement according to claim 1 in which the amount of said glass particles added to said formulation is about 0.5–10 parts per 1,000 parts of said formulation.

3. The improvement according to claim 1 in which said oxide is an oxide of a Group VA element, said passivating amount thereof is about 0.01–10 weight percent of said solution and is soluble in said solvent and said solution additionally contains at least 0.1 part per part of said Group VA oxide of an oxide of a second element, which additional oxide alone is insoluble alone in said solvent but which is soluble in said solvent in the presence of said Group VA oxide.

4. The improvement according to claim 3 in which said solution additionally contains at least 0.01 part of an oxide of a thrid element per part of said Group VA oxide, said third oxide being insoluble in said solvent in the presence alone of said Group VA oxide, but soluble in the presence in said solvent of both said Group VA oxide and said second oxide.

5. The improvement according to claim 3 in which said Group VA metal oxide is an oxide of phosphorus.

6. The improvement according to claim 5 in which said solution additionally contains at least 0.1 part of oxide of boron per part by weight of said oxide of phosphorus.

7. The improvement according to claim 6 in which said solution additionally contains at least 0.005 part of an oxide of vanadium per part by weight of said oxide of phosphorus.

8. The method according to claim 1 in which said solvent is an alcohol.

9. The method according to claim 1 in which said surface to be passivated is substantially unglassed and said device is heated at about 300°C or higher.

10. The method according to claim 1 in which said surface to be passivated is substantially glassed.

* * * * *